(12) United States Patent
Canari

(10) Patent No.: US 8,152,891 B2
(45) Date of Patent: Apr. 10, 2012

(54) METHOD FOR THE COMBINED PRODUCTION OF A SULFUR OXIDE CONTAINING PRODUCT AND A FERTILIZER

(75) Inventor: Riki Canari, Mobile Post Judean Hills (IL)

(73) Assignee: Clue AS, Nyborg, Bergen (NO)

( * ) Notice: Subject to any disclaimer, the term of this patent is extended or adjusted under 35 U.S.C. 154(b) by 855 days.

(21) Appl. No.: 12/085,232

(22) PCT Filed: Nov. 28, 2006

(86) PCT No.: PCT/IL2006/001366
§ 371 (c)(1),
(2), (4) Date: Oct. 6, 2008

(87) PCT Pub. No.: WO2007/063535
PCT Pub. Date: Jun. 7, 2007

(65) Prior Publication Data
US 2009/0255305 A1    Oct. 15, 2009

(30) Foreign Application Priority Data
Dec. 1, 2005    (IL) .......................................... 172305

(51) Int. Cl.
  C05B 7/00    (2006.01)
  C05C 1/00    (2006.01)
  C05C 1/18    (2006.01)
  C01B 25/28   (2006.01)
(52) U.S. Cl. ........... 71/34; 71/58; 423/243.08; 423/310; 423/312; 423/396; 423/519.2

(58) Field of Classification Search ............... 71/34, 58; 423/519.2, 243.09, 396, 308, 309, 310, 312, 423/313, 243.08
See application file for complete search history.

(56) References Cited

U.S. PATENT DOCUMENTS

| | | | |
|---|---|---|---|
| 3,421,848 A | 1/1969 | Popovici et al. ................ 23/107 |
| 4,028,087 A * | 6/1977 | Schultz et al. .................... 71/25 |
| 6,344,066 B1 * | 2/2002 | Eyal ................................. 71/34 |
| 6,447,437 B1 * | 9/2002 | Lee et al. ...................... 588/250 |

FOREIGN PATENT DOCUMENTS

| WO | WO 94/12266 | 6/1994 |
|---|---|---|
| WO | WO 96/20779 | 7/1996 |
| WO | WO 99/10084 | 3/1999 |

* cited by examiner

*Primary Examiner* — Wayne Langel
(74) *Attorney, Agent, or Firm* — Morgan, Lewis & Bockius LLP

(57) ABSTRACT

The invention provides a method for the combined production of (I) a sulfur oxide containing product and (II) a fertilizer selected from a group consisting of ammonium nitrate, ammonium phosphates and a combination thereof, through an indirect neutralization of ammonia with an acid selected from the group consisting of nitric acid, phosphoric acid and a combination thereof, the method comprising: a. contacting a precipitate containing calcium sulfite with a solution of nitric acid and a solution of ammonia in two separate steps, to form the fertilizer, the sulfur oxide containing product and a precipitate containing calcium hydroxide; and b. separating at least portion of the fertilizer, the sulfur oxide and the calcium hydroxide into three separated streams.

11 Claims, 5 Drawing Sheets

Figure 1:
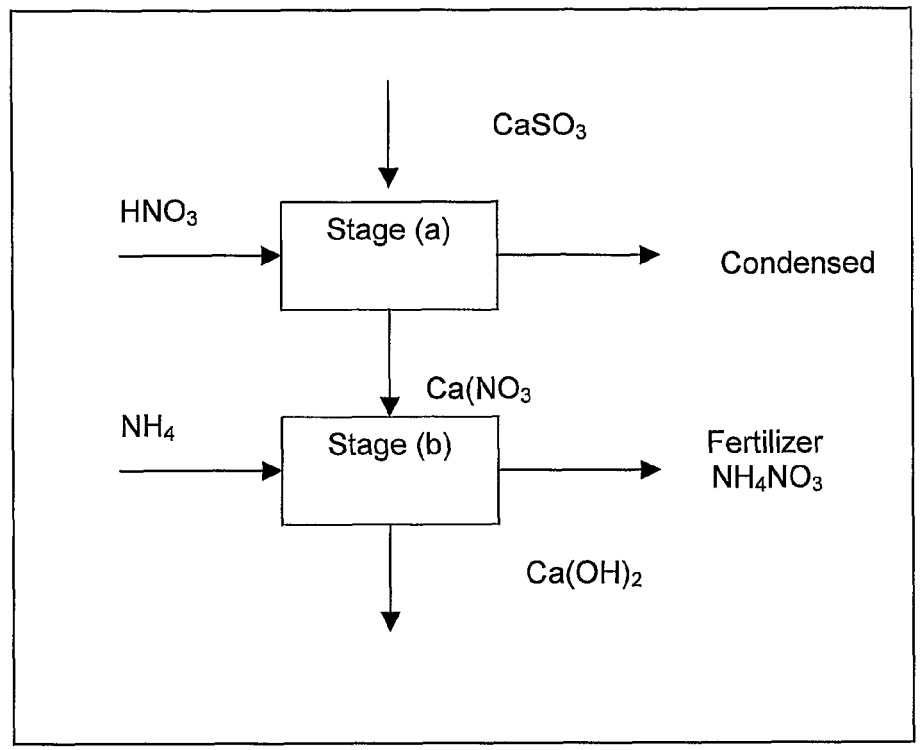

METHOD FOR THE COMBINED PRODUCTION OF A SULFUR OXIDE CONTAINING PRODUCT AND A FERTILIZER

The present invention relates to a method for the combined production of (I) a sulfur oxide containing product, and (II) a fertilizer selected from a group consisting of ammonium nitrate, ammonium phosphates and a combination thereof, through an indirect neutralization of ammonia with an acid selected from a group consisting of nitric acid, phosphoric acid and a combination thereof; said method comprising: contacting a precipitate containing calcium sulfite with a solution of nitric acid and a solution of ammonia in two separate steps, to form said fertilizer, said sulfur oxide containing product and a precipitate containing calcium hydroxide; and separating at least portion of said fertilizer, said sulfur oxide and said calcium hydroxide in three separated streams.

BACKGROUND ART

Fossil fuel combustion is used in industrial processes for many different purposes. Unfortunately, fossil fuel combustion produces several contaminants, which have been found to be detrimental to the environment. In particular, sulfur and nitrogen oxide compounds are the major components of "acid rain"

In recognition of the harm caused by SOx and NOx compounds, different combustion gas cleaning processes have been developed to remove these components of combustion flue gases prior to release of the flue gases into the atmosphere, especially since burning fossil fuel releases many millions of tons of $SO_2$ every year.

According to the Oslo Protocol, lime/limestone wet scrubbing (LWS) makes up 85% of all flue gas desulfurization (FGD) installations. In 1995 the FGD sector accounted for 15% of all lime sales in the US, mostly for LWS. In the LWS process the acidic, gaseous $SO_2$ in the flue gas is adsorbed into a re-circulated water based slurry of pretreated limestone with gypsum, and is subsequently neutralized by a reaction with $CaCO_3$. The products of the reaction are further reacted with air to produce predominantly calcium sulfate di-hydrate. The $SO_2$ removal capacity is dependent upon the inlet $SO_2$ content of the gas, the relative flow rate of the slurry and the pH of the slurry.

Another important desulfurization process is $SO_2$ removal by neutralization with an NaOH solution. Caustic soda is a strong base and is highly soluble in an aqueous solution, thus, a high pH and high absorption capacity can be achieved. However, the cost of NaOH is about ten times higher than that of lime/lime stone.

U.S. Pat. No. 6,447,437 describes a method for the reduction of air pollution caused by $SO_2$ by absorbing it with ammonia to form ammonium sulfite/sulfate followed by a stage of an anion-exchange reaction in which the sulfite/sulfate is exchanged by nitrate or phosphate anions to form a sulfur compound and a highly valued fertilizer; ammonium nitrate or ammonium phosphates.

Fertilizers are used in volumes of millions of tons per year. They are used all over the globe and throughout most of the year. Some of said fertilizers are salts produced by direct neutralization of an acid and a base. The main examples are ammonium nitrates, which are usually formed by the direct reaction of ammonia and nitric acid, and ammonium phosphates, which are usually formed in a reaction between phosphoric acid and ammonia. This direct reaction produces neutralization energy. The number of applications for said neutralization energy is limited. Therefore, choosing a fertilizer as a high value by-product of $SO_2$ removal has a great advantage.

As mentioned above U.S. Pat. No. 6,447,437 suggests producing the fertilizer through indirect neutralization of ammonia with said nitric acid or phosphoric acid by combining it with the absorption of $SO_2$ from flue gas. However, using ammonia as the neutralizing base in those systems is practically difficult. The flue gases are emitted at high temperatures of about 200-400° C. whereas the ammonia b.p. is −33° C., while ammonia salt tends to decompose at high temperatures. In addition, the ammonia has an unpleasant odor, the gas irritates all parts of the respiratory system and is extremely irritating to the eyes.

A major disadvantage of this process is that a combined production of two main products that are totally different is usually undesirable, especially in industries involved with the combustion of oil and coal for electric power stations. These stations are not characterized by high technology for fine chemical products. Fertilizer production requires certain specifications with which electric power stations are not associated.

Therefore, there is still a great need for a desulphurization process that is characterized by an efficient absorption of $SO_2$ from flue gases, and ease of use even in high temperatures. In addition, this process should enable the recycling or selling of all by-products and thus avoid discharging pollution into the environment.

It will thus be realized that the present invention serves to combine two processes: (I) the process of reducing air pollution caused by $SO_2$ by using a common desulphurization process, i.e., such as the simple lime/limestone wet scrubbing or wet scrubbing with NaOH; and (II) the process of the combined production, from the by-product resulting from said first process, of (a) a fertilizer containing ammonium nitrate or ammonium phosphate; and (b) a sulfur oxide containing product.

A further purpose of the present invention is to utilize the driving force that is associated with the production of the fertilizer, said fertilizer being available in large amounts, in many locations and throughout most of the year, for the production of sulfur compounds from sulfur oxide containing gases.

DISCLOSURE OF THE INVENTION

With this state of the art in mind, there is now provided, according to the present invention, a method for the combined production of (I) a fertilizer containing ammonium nitrate or ammonium phosphate and (II) a sulfur oxide containing product, said method comprising:

a. contacting a precipitate containing calcium sulfite with a solution of ammonia and a solution containing a compound selected from the group consisting of nitric acid, phosphoric acid and ammonium phosphate and a combination thereof, in two separate steps, to form said fertilizer, said sulfur oxide containing product and a precipitate containing calcium hydroxide; and b. separating at least a portion of said fertilizer, said sulfur oxide and said calcium hydroxide into three separated streams.

The term calcium sulfite as used in the present specification refers to a $CaHSO_3, CaSO_3$ and a combination thereof.

The term sulfur oxide as used in the present specification refers to a $SO_2$ and $H_2SO_3$.

According to a preferred embodiment said precipitate containing calcium sulfite is formed by contacting a sulfur oxide containing flue gas resulting from the combustion of sulfur-containing hydrocarbons, and containing carbon dioxide, with a basic stream that contains a compound selected from the group consisting of CaO, Ca(OH)$_2$, CaCO$_3$, cement and a combination thereof, whereby calcium sulfite is formed and the resulting gas has a reduced SO$_2$ content.

Said sulfur oxide containing flue gas could result from various industrial productions involving the combustion of sulfur-containing hydrocarbons but of special interest is the production of flue gas resulting from the combustion of oil and coal. Of particularly high interest are those productions wherein a high sulfur fuel is used. Said gas is contacted with a basic stream that reacts with said sulfur oxide in an acid-base reaction to form calcium sulfite. In one embodiment said basic stream that contains a compound selected from the group consisting of CaO, Ca(OH)$_2$, CaCO$_3$, cement and a combination thereof, contains in addition another compound selected from the group consisting of NaOH, KOH, NaHCO$_3$ or combination thereof.

According to another preferred embodiment of the present invention said precipitate containing calcium sulfite is formed by a. contacting a sulfur oxide containing flue gas resulting from the combustion of sulfur-containing hydrocarbons, and containing carbon dioxide with a basic stream that contains a compound selected from the group consisting of NaOH, KOH, NaHCO$_3$ or combination thereof, whereby a sulfite salt is formed and the resulting gas has a reduced SO$_2$ content;

b. contacting said sulfite salt from step (a) with another basic stream selected from the group consisting of CaO, Ca(OH)$_2$, CaCO$_3$ to form calcium sulfite and a base selected from the group consisting of NaOH, KOH, NaHCO$_3$ or combination thereof;

c. Recycling said base formed in step (b) back to step (a).

According to one embodiment said basic stream contains said precipitate containing calcium hydroxide that formed in step (a) as mentioned above, which is recycled.

According to a preferred embodiment, said basic stream contains a compound selected from the group consisting of water and sea water. In this embodiment, the sea water has two functions; it serves as the medium for the added base (e.g. CaO, Ca(OH)$_2$, CaCO$_3$, NaOH, KOH, NaHCO$_3$); and the sea water enables the reduction of the required amount of the added base due to its buffer capacity. The applicability of sea water is extremely important in the absorption of SO$_2$ from flue gases of ships. In these situations sea water is readily available and discharging the used sea water back into the sea is legal in most cases.

According to another embodiment, during the combustion of sulfur-containing hydrocarbons and during the stages of SO$_2$ absorption, the resultant sulfur oxide containing product may be oxidized, thereby producing a fertilizer containing ammonium sulfate.

Especially preferred is the embodiment wherein said precipitate containing calcium sulfite is contacted first with a solution of nitric acid to form said sulfur oxide and calcium nitrate solution, whereby said calcium nitrate solution is then contacted with an ammonia solution, to form said fertilizer-containing product and a precipitate containing calcium hydroxide.

In another preferred embodiment said precipitate containing calcium sulfite is contacted first with an ammonia solution to form said precipitate containing calcium hydroxide and a solution of ammonium sulfite, whereby said ammonium sulfite is then contacted with nitric acid, to form said sulfur oxide and said fertilizer. In this case according to one embodiment said ammonium sulfite is contacted with a compound selected from the group consisting of phosphoric acid, ammonium phosphate, and a combination thereof (instead of nitric acid) to form said sulfur oxide and a fertilizer containing ammonium phosphate.

As mentioned above said sulfur oxide containing flue gas could result from various industrial productions involving the combustion of sulfur-containing hydrocarbons. These flue gases contain significant amounts of CO$_2$, in some cases more than 20%. CO$_2$ reacts with the base added—said basic stream—and thus, according to a preferred embodiment, said precipitate that contains calcium sulfite contains in addition calcium carbonate.

According to one embodiment a solution of nitric acid is added in two batches to said precipitate containing calcium sulfite and calcium carbonate, a first portion to replace the carbonate ion and a second to replace the sulfite ion, thereby having four streams which result from step (b) above; said fertilizer stream, said sulfur oxide stream, said calcium hydroxide stream and a CO$_2$ stream.

In general the present invention involves combining two processes, the combination of which was not obvious from the known prior art:

(a). using a common desulphurization process, such as the simple lime/limestone wet scrubbing or wet scrubbing with NaOH, to reduce air pollution caused by SO$_2$ and, (b) using the by-product salt resulting from said first process for the combined production of (I) a fertilizer containing ammonium nitrate or ammonium phosphate and (II) a sulfur oxide containing product.

The present invention combines these two processes. First, it utilizes a process that is characterized by efficient absorption of SO$_2$ from flue gases, which is known and commonly used, and is also characterized by having a simple and easy method of operation even at high temperatures. Second, it utilizes a process of fertilizer production that enables the re-use of all products and by-products by recycling or selling them, and thus, avoids discharging pollution back into the environment.

The combination of these two processes in the present invention can be carried out due to specific ion-exchange reactions, which are characterized by the required ion-exchange selectivity and by selective separation operations. These specific ion-exchange reactions enable the replacement of the anion and the cation of the salts formed in the desulphurization reaction, thereby forming the required fertilizer. The selective separation operations separate the formed products so that: (a) the added base/s can be recycled back to the desulphurization process, and (b) two separated purified streams of the fertilizer and of the formed sulfur oxide can be produced.

This combination is not obvious as it is not feasible in all chosen systems. In fact it operated only in some specific ones. A simple example for the opposite case is as follows. One may wish to combine the NaOH desulphurization reaction directly with the ammonium nitrate production. For that purpose the Na$_2$SO$_3$ formed in the NaOH desulphurization reaction should be reacted first with ammonia in order to replace the cation (Na). However, by adding the ammonia, an ammonium sulfite is formed and since it is highly soluble in an aqueous solution as is the NaOH, a mixture solution is formed. As a result separation of the added base (NaOH) is not feasible and thus, recycling it back to the desulfurization reaction is not practical. In addition, separating two purified streams of fertilizer and of sulfur oxide cannot be accomplished.

This is only one example for emphasizing that the selected combination has to be characterized by the required selectivity of the ion-exchange reaction and by feasible selective separation operations as taught for the first time according to the present invention. The present invention suggests several processes that deal with these strict demands.

While the invention will now be described in connection with certain preferred embodiments in the following examples and with reference to the accompanying figures so that aspects thereof may be more fully understood and appreciated, it is not intended to limit the invention to these particular embodiments. On the contrary, it is intended to cover all alternatives, modifications and equivalents as may be included within the scope of the invention as defined by the appended Claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

In the drawings:

FIGS. 1-6 present flow diagrams of embodiments of the present invention.

FIG. 1 presents a process of two stages. In stage (a) a precipitate containing calcium sulfite is contacted with a solution of nitric acid. Nitric acid is a stronger acid than $H_2SO_3$ thus, a selective anion exchange reaction takes place to form $Ca(NO_3)_2$ and free $H_2SO_3$, which converts into water and $SO_2$ that is released to the gas phase. Based on the fact that the solubility of $Ca(NO_3)_2$ in aqueous solution is high, it is spontaneously separated from the reagent, which is said precipitate containing calcium sulfite. In this stage an $SO_2$ gas stream and an aqueous solution of $Ca(NO_3)_2$ are separated.

In stage (b) $Ca(NO_3)_2$ solution is contacted with ammonia to form $Ca(OH)_2$ and ammonium nitrate. $Ca(OH)_2$ is precipitated, thus, it can be easily separated from the fertilizer solution, since its solubility in aqueous solution is very low. The limited solubility of the lime or its crystallization energy-gain provides the driving force for this stage.

Figure 2:
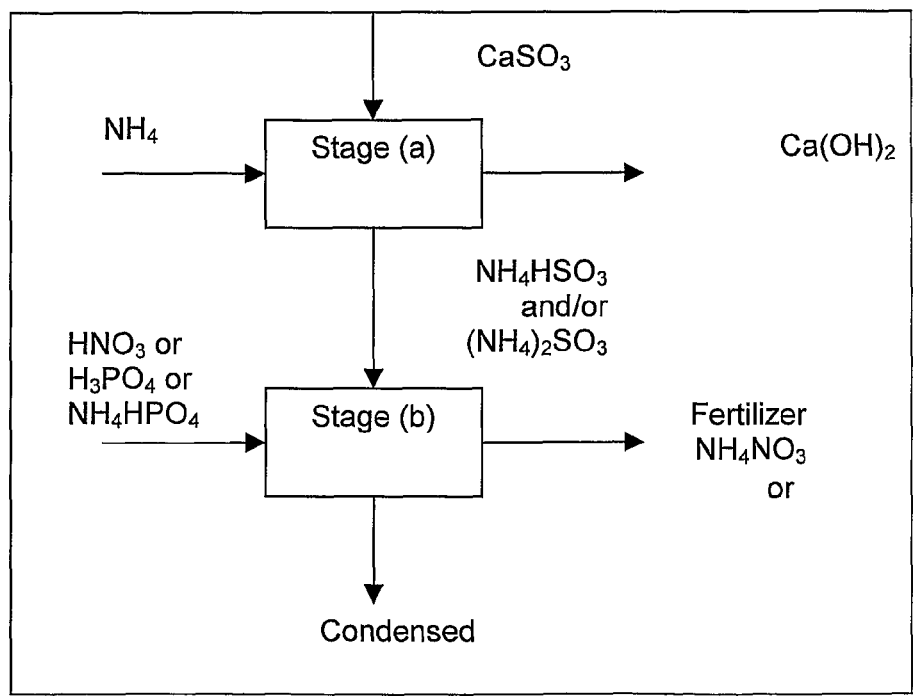

FIG. 2 presents a process of two stages. In Stage (a) a precipitate containing calcium sulfite is contacted with a solution of ammonia to form ammonium sulfite and $SO_2$ in a gas phase. The molar ratio between the calcium (divalent) and the ammonia (monovalent) is higher than 2.4. Since ammonia is a weaker base than $Ca(OH)_2$, a full cation exchange may be formed only by having an excess of ammonia. In Stage (b) the mixture solution of ammonium sulfite and ammonia is contacted with a solution of a reagent selected from the group consisting of nitric acid, phosphoric acid, ammonium phosphate and a mixture thereof. The reaction forms said fertilizer and a concentrated stream of $SO_2$ gas. If for simplicity we represent the sulfite product formed in Step (a) as ammonium bisulfite, some of the reactions in this stage could be presented as:

$$2NH_4HSO_3 + H_3PO_4 \rightarrow (NH_4)_2HPO_4 + 2SO_2 + 2H_2O; \quad (1)$$

$$NH_4HSO_3 + HNO_3 \rightarrow NH_4NO_3 + SO_2 + H_2O; \text{ and} \quad (2)$$

$$NH_4HSO_3 + NH_4H_2PO_4 \rightarrow (NH_4)_2HPO_4 + SO_2 + H_2O. \quad (3)$$

(Whereas, the chemistry could be much more complicated than shown by the equation.)

Figure 3:
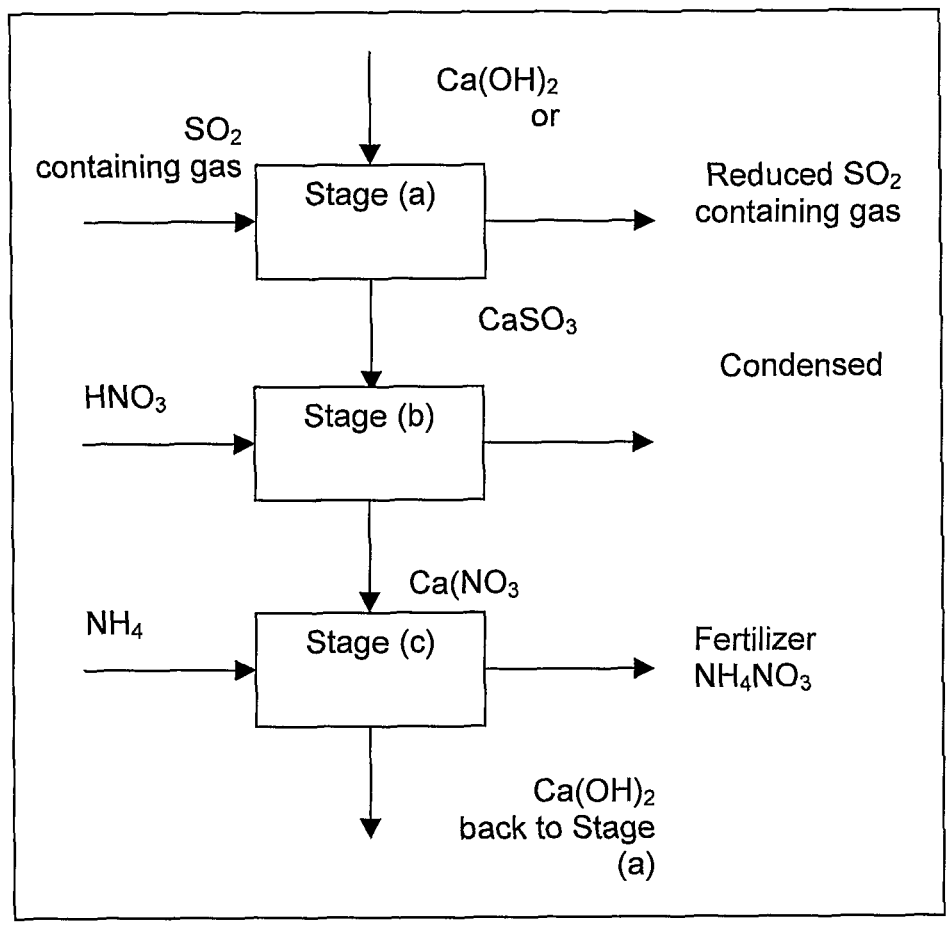

FIG. 3 presents a process of three stages. In the first stage said precipitate containing calcium sulfite (mentioned in Stage (a) of FIG. 1) is formed by contacting a basic stream that contains a compound selected from the group consisting of CaO, $Ca(OH)_2$, $CaCO_3$, cement and a combination thereof, with a sulfur oxide and carbon dioxide containing flue gas resulting from the combustion of sulfur-containing hydrocarbons whereby calcium sulfite is formed and the resulting gas has a reduced $SO_2$ content. This calcium sulfite stream then proceeds to Stage (b) (which is identical to Stage (a) of the process presented in FIG. 1 described above), while the following stage, Stage (c) in FIG. 3, is identical to the described Stage (b) of the process in FIG. 1.

Figure 4:
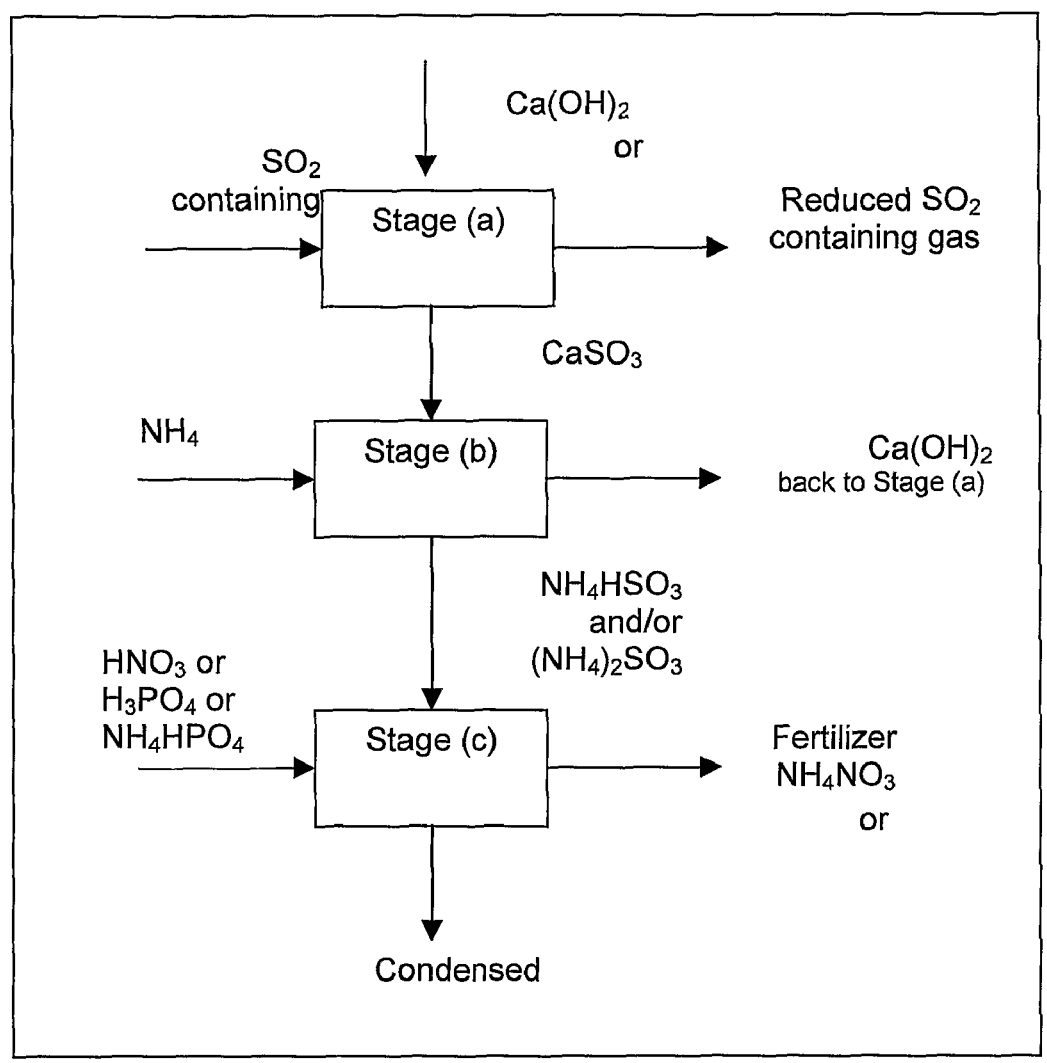

FIG. 4 presents a process of three stages. In the first stage said precipitate containing calcium sulfite is formed as presented in FIG. 3 by contacting a sulfur oxide containing flue gas resulting from the combustion of sulfur-containing hydrocarbons with a basic stream that contains a compound selected from the group consisting of CaO, $Ca(OH)_2$, $CaCO_3$, cement and a combination thereof, whereby calcium sulfite is formed and the resulting gas has a reduced $SO_2$ content. This calcium sulfite stream proceeds to Stage (b) which is identical to Stage (a) of the process presented in FIG. 2 as described above, while the following stage, Stage (c), in FIG. 3 is identical to the described Stage (b) of the process in FIG. 2.

Figure 5:
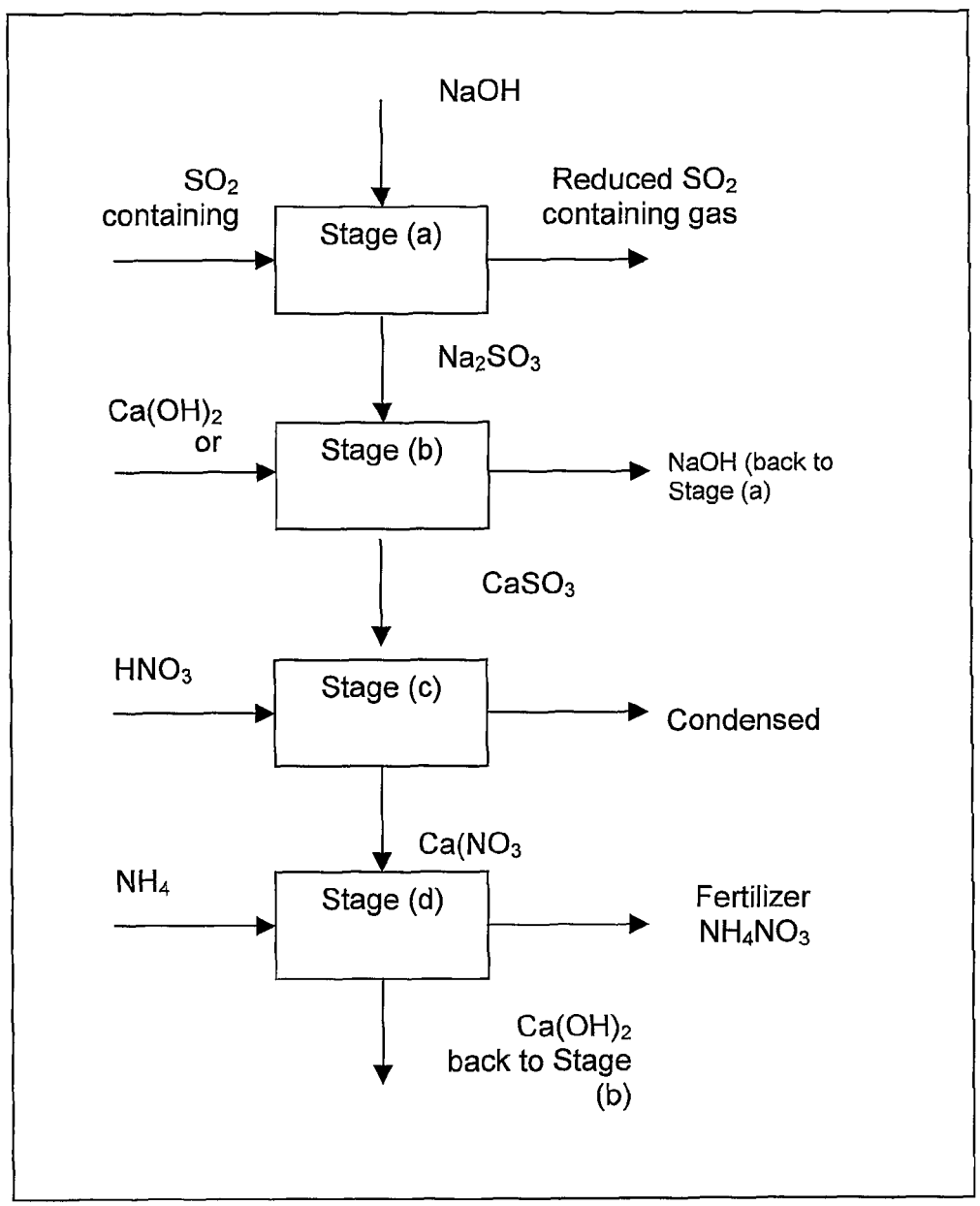

FIG. 5 presents a process of four stages. In the first stage NaOH in an aqueous solution is contacted with sulfur oxide containing flue gas resulting from the combustion of sulfur-containing hydrocarbons to form a sodium salt comprised of sodium sulfite, sodium bisulfite or a mixture thereof. In stage (b) calcium hydroxide is reacted with said sodium salt to form calcium sulfite and thereby regenerates the first base NaOH, that is then recycled to step (a). This calcium sulfite stream proceeds to Stage (c) which is identical to Stage (a) of the process presented in FIG. 1 as described above, while the following stage, Stage (d), in FIG. 5 is identical to the described Stage (b) of the process in FIG. 1.

Figure 6:
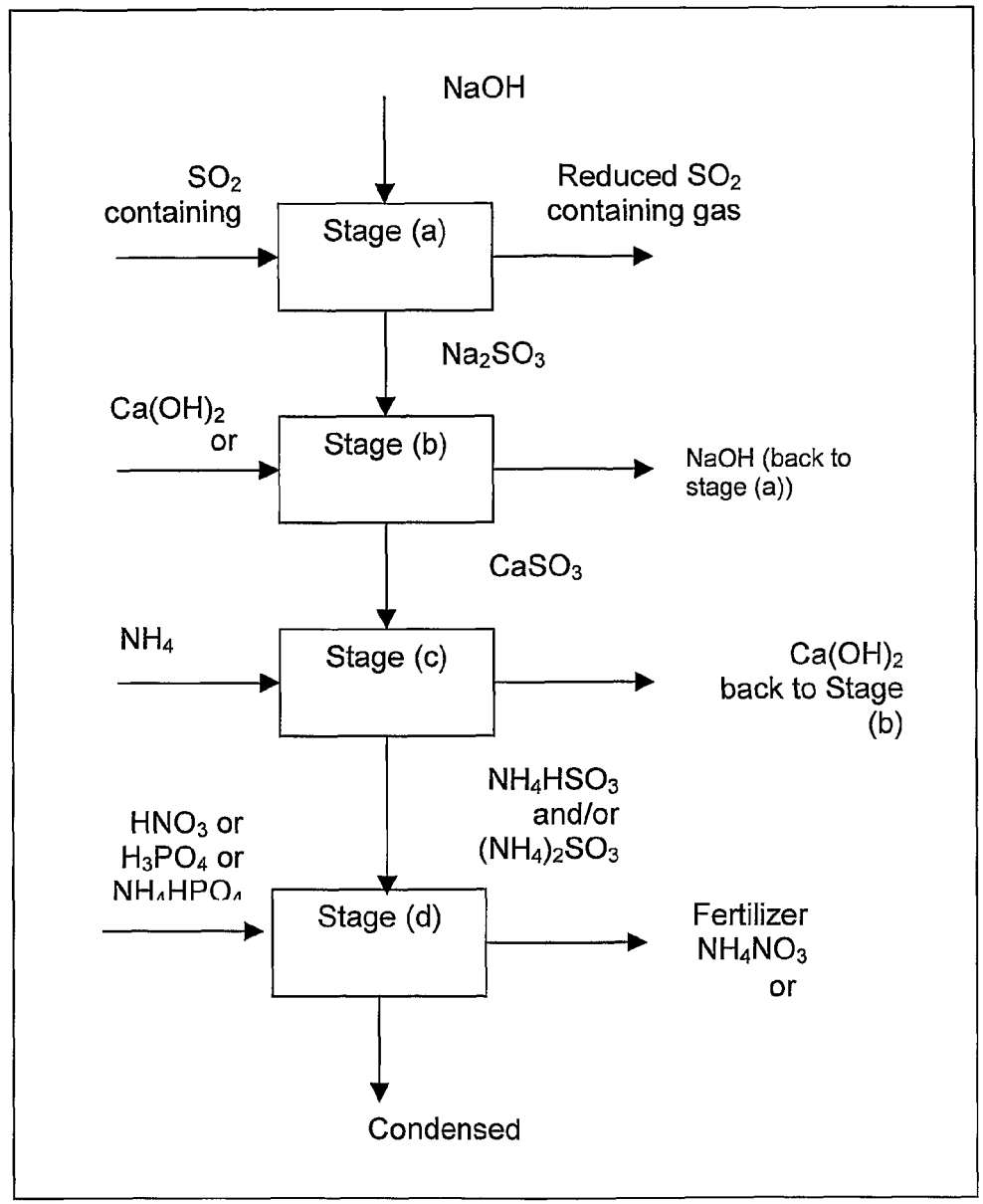

FIG. 6 presents a process of four stages. In the first stage as presented in FIG. 5, NaOH in an aqueous solution is contacted with sulfur oxide containing flue gas resulting from the combustion of sulfur-containing hydrocarbons to form sodium salt of sodium sulfite, sodium bisulfite or a mixture thereof. In stage (b) calcium hydroxide is reacted with said sodium salt to form calcium sulfite and thereby regenerates the first base NaOH that is recycled to Step (a). This calcium sulfite stream enters Stage (c) which is identical to Stage (a) of the process presented in FIG. 2 as described above, while the following stage, Stage (d), in FIG. 6 is identical to Stage (b) of the process in FIG. 2, as described above.

DESCRIPTION OF PREFERRED EMBODIMENTS

Example 1

A gas composed of about 73% $N_2$, 13% $CO_2$, 10% $H_2O$, 4% $O_2$ and 0.3% $SO_2$ is bubbled slowly through a long column containing NaOH solution. More than 90% of the $SO_2$ of the incoming gas is adsorbed.

Example 2

Part of the solution formed in Example 1 is reacted with a solution of 30% nitric acid. The relative volumes of the solutions are selected so that the molar ratio of nitric acid to sodium is 1.1 to 1.0. Sodium nitrate is formed and most of the $SO_2$ absorbed in Example 1 evolves.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A method for the combined production of
   (I) a sulfur oxide containing product and
   (II) an ammonium nitrate fertilizer, through an indirect neutralization of ammonia with nitric acid, said method comprising:
   a. contacting a precipitate containing calcium sulfite with a solution of nitric acid and a solution of ammonia in two separate steps, to form said fertilizer, said sulfur oxide containing product and a precipitate containing calcium hydroxide, wherein said precipitate containing calcium sulfite is contacted first with a solution of nitric acid to form said sulfur oxide and a calcium nitrate solution, and further wherein said calcium nitrate solution is then contacted with an ammonia solution to form said fertilizer as an ammonium nitrate containing product and a precipitate containing calcium hydroxide; and
   b. separating at least a portion of said fertilizer, said sulfur oxide and said calcium hydroxide into three separated streams.

2. A method according to claim 1 wherein said precipitate containing calcium sulfite is formed by contacting a sulfur oxide and carbon dioxide containing flue gas resulting from the combustion of sulfur-containing hydrocarbons, with a basic stream that contains a compound selected from the group consisting of CaO, $Ca(OH)_2$, $CaCO_3$, cement and a combination thereof, whereby calcium sulfite is formed and the resulting gas has a reduced $SO_2$ content.

3. A method according to claim 2 wherein said basic stream contains a compound selected from the group consisting of NaOH, KOH, $NaHCO_3$ and a combination thereof.

4. A method according to claim 1 wherein said precipitate containing calcium sulfite is formed by:
   a. contacting a sulfur oxide and carbon dioxide containing flue gas resulting from the combustion of sulfur-containing hydrocarbons with a first basic stream that contains a compound selected from the group consisting of NaOH, KOH, $NaHCO_3$ and a combination thereof, whereby a sulfite salt is formed and the resulting gas has a reduced $SO_2$ content;
   b. contacting said sulfite salt from step (a) with a second basic stream selected from the group consisting of CaO, $Ca(OH)_2$, $CaCO_3$, cement and a combination thereof to form calcium sulfite and said first base selected from the group consisting of NaOH, KOH, $NaHCO_3$ and a combination thereof;
   c. recycling said first base formed in step (b) back to step (a).

5. A method according to claim 2 or claim 4 wherein said basic stream that contains calcium hydroxide was formed in step (a) of claim 1.

6. A method according to claim 2 or claim 4 wherein said basic stream contains a compound selected from the group consisting of water and sea water.

7. A method according to claim 1 wherein said fertilizer contains ammonium sulfate.

8. A method according to claim 1 wherein said precipitate containing calcium sulfite contains calcium carbonate.

9. A method according to claim 8 wherein said solution of nitric acid is added in two batches to said precipitate containing calcium sulfite and calcium carbonate, a first batch to replace the carbonate ion and a second batch to replace the sulfite ion, thereby forming two separate streams of said sulfur oxide and $CO_2$.

10. A method for the combined production of
    (I) a sulfur oxide containing product and
    (II) an ammonium nitrate fertilizer, through an indirect neutralization of ammonia with nitric acid, said method comprising:
    a. contacting a precipitate containing calcium sulfite with a solution of nitric acid and a solution of ammonia in two separate steps, to form said fertilizer, said sulfur oxide containing product and a precipitate containing calcium hydroxide, wherein said precipitate containing calcium sulfite is contacted first with an ammonia solution to form said precipitate containing calcium hydroxide and a solution of ammonium sulfite, and further wherein said ammonium sulfite is then contacted with nitric acid, to form said sulfur oxide and a fertilizer product containing ammonium nitrate; and
    b. separating at least a portion of said fertilizer, said sulfur oxide and said calcium hydroxide into three separated streams.

11. A method for the combined production of
    (I) a sulfur oxide containing product and
    (II) an ammonium phosphate fertilizer, through an indirect neutralization of ammonia with phosphoric acid, said method comprising:
    a. contacting a precipitate containing calcium sulfite with a solution of phosphoric acid and a solution of ammonia in two separate steps, to form said fertilizer, said sulfur oxide containing product and a precipitate containing calcium hydroxide, wherein said precipitate containing calcium sulfite is contacted first with an ammonia solution to form said precipitate containing calcium hydroxide and a solution of ammonium sulfite, and further wherein said ammonium sulfite is then contacted with phosphoric acid to form said sulfur oxide and a fertilizer product containing ammonium phosphate; and
    b. separating at least a portion of said fertilizer, said sulfur oxide and said calcium hydroxide into three separated streams.

* * * * *